United States Patent
Qiu

(10) Patent No.: US 12,315,029 B2
(45) Date of Patent: May 27, 2025

(54) IMAGE RENDERING METHOD, DEVICE, EQUIPMENT AND COMPUTER-READABLE STORAGE MEDIUM

(71) Applicant: GOERTEK INC., Shandong (CN)

(72) Inventor: Xudong Qiu, Shandong (CN)

(73) Assignee: GOERTEK INC., Shandong (CN)

( * ) Notice: Subject to any disclaimer, the term of this patent is extended or adjusted under 35 U.S.C. 154(b) by 0 days.

(21) Appl. No.: 18/007,202

(22) PCT Filed: Nov. 2, 2021

(86) PCT No.: PCT/CN2021/128030
§ 371 (c)(1),
(2) Date: Jan. 27, 2023

(87) PCT Pub. No.: WO2023/005042
PCT Pub. Date: Feb. 2, 2023

(65) Prior Publication Data
US 2024/0265485 A1    Aug. 8, 2024

(30) Foreign Application Priority Data
Jul. 27, 2021   (CN) .......................... 202110853251.4

(51) Int. Cl.
*G06T 1/20*      (2006.01)
*G06T 15/00*     (2011.01)
*G06T 19/00*     (2011.01)

(52) U.S. Cl.
CPC .............. *G06T 1/20* (2013.01); *G06T 15/005* (2013.01); *G06T 19/006* (2013.01)

(58) Field of Classification Search
CPC ....... G06T 1/20; G06T 15/005; G06T 19/006; H04N 21/816; H04N 21/44004
(Continued)

(56) References Cited

U.S. PATENT DOCUMENTS

2009/0100096 A1* 4/2009 Erlichson ................ H04L 67/02
2017/0125064 A1* 5/2017 Aggarwal .............. H04N 5/222
(Continued)

FOREIGN PATENT DOCUMENTS

CN         109358830 A       2/2019
CN         109887065 A       6/2019
(Continued)

*Primary Examiner* — Prabodh M Dharia
(74) *Attorney, Agent, or Firm* — LKGlobal | Lorenz & Kopf, LLP

(57) ABSTRACT

An image rendering method including acquiring a current first data to be rendered of a first viewpoint and starting rendering; if the rendering of the first data to be rendered has not been completed at a T2 moment, stopping rendering the first data, and acquiring a current second data to be rendered of the second viewpoint and starting rendering; if the rendering of the first data to be rendered has been completed before the T2 moment, acquiring the second data to be rendered and starting rendering; and at the T2 moment, performing asynchronous time warping on a frame image of the first viewpoint obtained from the last time of rendering and then storing it in a display buffer, and performing asynchronous time warping on a frame image of the second viewpoint obtained from the last time of rendering and then storing it in the display buffer.

20 Claims, 4 Drawing Sheets

(58) Field of Classification Search
USPC .................................................. 345/522, 647
See application file for complete search history.

(56) References Cited

U.S. PATENT DOCUMENTS

| | | |
|---|---|---|
| 2019/0043448 A1 | 2/2019 | Thakur et al. |
| 2019/0333263 A1* | 10/2019 | Melkote Krishnaprasad ............... G06F 3/012 |
| 2020/0265587 A1* | 8/2020 | Fan ........................... G06T 3/18 |
| 2023/0062363 A1* | 3/2023 | Golshan ................ H04W 4/023 |
| 2023/0267578 A1* | 8/2023 | Fan ........................... G06T 5/80 345/647 |
| 2024/0005876 A1* | 1/2024 | Kim ........................ G09G 5/14 |

FOREIGN PATENT DOCUMENTS

| | | | |
|---|---|---|---|
| CN | 112230776 A | 1/2021 | |
| CN | 113538648 A | 10/2021 | |

* cited by examiner

IMAGE RENDERING METHOD, DEVICE, EQUIPMENT AND COMPUTER-READABLE STORAGE MEDIUM

CROSS-REFERENCE TO RELATED APPLICATIONS

This Application is a U.S. National-Stage entry under 35 U.S.C. § 371 based on International Application No. PCT/CN2021/128030, filed Nov. 2, 2021 which was published under PCT Article 21(2) and which claims priority to Chinese Application No. 202110853251.4, filed Jul. 27, 2021, which are all hereby incorporated herein in their entirety by reference.

TECHNICAL FIELD

This application pertains to the technical field of image processing, in particular to an image rendering method, device, equipment and computer-readable storage medium.

BACKGROUND

AR/VR refreshes rendered virtual images on the display device by means of image rendering technology, and users can experience the virtual display effect or enhanced display effect via a head mounted display device. Because the rendering process takes time, it will cause a time delay between the reality and the perception. The delay must be controlled within a certain range, otherwise users will experience discomfort such as dizziness. To alleviate the discomfort, the ATW (Asynchronous Time Warp) technology emerged.

In existing smart glasses, assume that the screen refresh period is T, then the left eye is rendered in the first T/2. If the rendering of the left eye has been completed before the T/2 moment, it will wait until the T/2 moment to render the right eye. The start of the ATW of the left eye is fixed at the T/2 moment, and the start of the ATW of the right eye is fixed at the T moment. If the ATW has not been completed when the next ATW starts, the previous frame will be used instead. Under this rendering mechanism, the rendering process may have waiting time periods and useless rendering, and thus there is waste of GPU resources for processing and the utilization rate of image rendering is low. In addition, other objects, desirable features and characteristics will become apparent from the subsequent summary and detailed description, and the appended claims, taken in conjunction with the accompanying drawings and this background.

SUMMARY

The main object of the present disclosure is to provide an image rendering method, device, equipment and computer-readable storage medium, aiming to solve the technical problems in the existing rendering mechanism that there is waste of GPU resources for processing and the utilization rate of image rendering is low.

To achieve the above object, the present disclosure provides an image rendering method. The method comprises the following steps:
after receiving a synchronization signal transmitted according to a preset time period T1, acquiring a current first data to be rendered of a first viewpoint and starting rendering;
if the rendering of the first data to be rendered has not been completed at a T2 moment after receiving the synchronization signal, stopping rendering the first data to be rendered, and acquiring a current second data to be rendered of a second viewpoint and starting rendering, where 0<T2<T1;
if the rendering of the first data to be rendered has been completed before the T2 moment after receiving the synchronization signal, acquiring the second data to be rendered and starting rendering after the rendering of the first data to be rendered has been completed; and
at the T2 moment after receiving the synchronization signal, performing asynchronous time warping on a frame image of the first viewpoint obtained from the last time of rendering and then storing it in a display buffer, and at a moment of receiving the synchronous signal, performing asynchronous time warping on a frame image of the second viewpoint obtained from the last time of rendering and then storing it in the display buffer.

Optionally, the step of after receiving a synchronization signal transmitted according to a preset time period T1, acquiring a current first data to be rendered of a first viewpoint and starting rendering comprises:
when receiving the synchronization signal transmitted according to the preset time period T1, detecting whether there is a third data to be rendered that is being rendered at the second viewpoint;
if yes, stopping rendering the third data to be rendered, and acquiring the current first data to be rendered of the first viewpoint and starting rendering;
if no, acquiring the first data to be rendered and starting rendering.

Optionally, the method further comprises:
at the moment of receiving the synchronization signal, acquiring a first viewpoint frame image of the first viewpoint currently buffered in the display buffer; and
using the first viewpoint frame image to refresh a frame image of the first viewpoint currently displayed in the display device.

Optionally, the method further comprises:
at the T2 moment after receiving the synchronization signal, acquiring a second viewpoint frame image of the second viewpoint currently buffered in the display buffer; and
using the second viewpoint frame image to refresh a frame image of the second viewpoint currently displayed in the display device.

Optionally, the method further comprises:
if the rendering of the first data to be rendered has not been completed at the T2 moment after receiving the synchronization signal, increasing a number of times of frame dropping of the first viewpoint by one; and
when it is detected that the number of times of frame dropping of the first viewpoint reaches a preset number, increasing T2, wherein the T2 after increased is less than T1.

Optionally, the method further comprises:
if the rendering of the first data to be rendered has not been completed at the T2 moment after receiving the synchronization signal, increasing a number of times of frame dropping of the first viewpoint by one;
if there is data to be rendered that is being rendered at the second viewpoint at the moment of receiving the synchronization signal, increasing a number of times of frame dropping of the second viewpoint by one;
when it is detected that a ratio of the number of times of frame dropping of the first viewpoint to the number of times of frame dropping of the second viewpoint is greater than a preset ratio, increasing T2, wherein the T2 after increased is less than T1; and When it is detected that a ratio of the number of times of frame dropping of the second viewpoint to the number of times of frame dropping of the first viewpoint is greater than the preset ratio, decreasing T2, wherein the T2 after decreased is greater than 0.

Optionally, the method further comprises:

when the synchronization signal is received for the first time, setting one of the first viewpoint and the second viewpoint as a left eye viewpoint and the other as a right eye viewpoint; and exchanging the settings of the first viewpoint and the second viewpoint about the left and right eye viewpoints every preset time period T3 since the synchronization signal is received for the first time.

To achieve the above object, the present disclosure also provides an image rendering device, which comprises:

a first rendering module for, after receiving a synchronization signal transmitted according to a preset time period T1, acquiring a current first data to be rendered of a first viewpoint and starting rendering;

a second rendering module for, if the rendering of the first data to be rendered has not been completed at a T2 moment after receiving the synchronization signal, stopping rendering the first data to be rendered, and acquiring a current second data to be rendered of a second viewpoint and starting rendering, wherein 0<T2<T1; and for, if the rendering of the first data to be rendered has been completed before the T2 moment after receiving the synchronization signal, acquiring the second data to be rendered and starting rendering after the rendering of the first data to be rendered has been completed; and a buffer module for, at the T2 moment after receiving the synchronization signal, performing asynchronous time warping on a frame image of the first viewpoint obtained from the last time of rendering and then storing it in a display buffer, and at a moment of receiving the synchronous signal, performing asynchronous time warping on a frame image of the second viewpoint obtained from the last time of rendering and then storing it in the display buffer.

To achieve the above object, the present disclosure also provides image rendering equipment, which comprises a memory, a processor, and an image rendering program stored on the memory and capable of running on the processor. When the image rendering program is executed by the processor, the steps of the image rendering method as described above are implemented.

In addition, to achieve the above object, the present application also proposes a computer-readable storage medium having an image rendering program stored thereon. When the image rendering program is executed by a processor, the steps of the image rendering method as described above are implemented.

In the present disclosure, after receiving the synchronization signal, the current first data to be rendered of the first viewpoint is acquired to start rendering; if the rendering of the first data to be rendered has not been completed at the T2 moment after receiving the synchronization signal, the rendering of the first data to be rendered stops, and the current second data to be rendered of the second viewpoint is acquired to start rendering; if the rendering of the first data to be rendered has been completed before the T2 moment after receiving the synchronization signal, the second data to be rendered is acquired after the rendering of the first data to be rendered has been completed to start rendering; at the T2 moment after receiving the synchronization signal, the asynchronous time warping is performed on a frame image of the first viewpoint obtained from the last time of rendering, and then the frame image obtained is stored in the display buffer, and at the T2 moment after receiving the synchronization signal, the asynchronous time warping is performed on a frame image of the second viewpoint obtained from the last time of rendering, and then the frame image obtained is stored in the display buffer.

In the present disclosure, when the rendering of the first data to be rendered has not been completed at the T2 moment, the rendering of the first data to be rendered stops, thereby preventing the GPU from doing useless work and wasting GPU resources by avoiding the further rendering of the first data to be rendered. When the rendering of the first data to be rendered has been completed before the T2 moment, the GPU can immediately acquire the second data to be rendered at the current moment of the second viewpoint for rendering, thereby preventing the GPU from wasting GPU resources due to the waiting state. Moreover, since the rendering of the second data to be rendered starts at an earlier moment, the rendering completion rate of the second data to be rendered is also improved, thereby further reducing the possibility of GPU doing useless work and thus improving the utilization ratio of image rendering.

BRIEF DESCRIPTION OF DRAWINGS

The present invention will hereinafter be described in conjunction with the following drawing figures, wherein like numerals denote like elements, and.

The realization of the object, functional features and advantages of the present disclosure will be further described in conjunction with embodiments with reference to the drawings.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

It should be understood that the specific embodiments described herein are only used to explain the present disclosure, not to limit the present disclosure.

Figure 1:
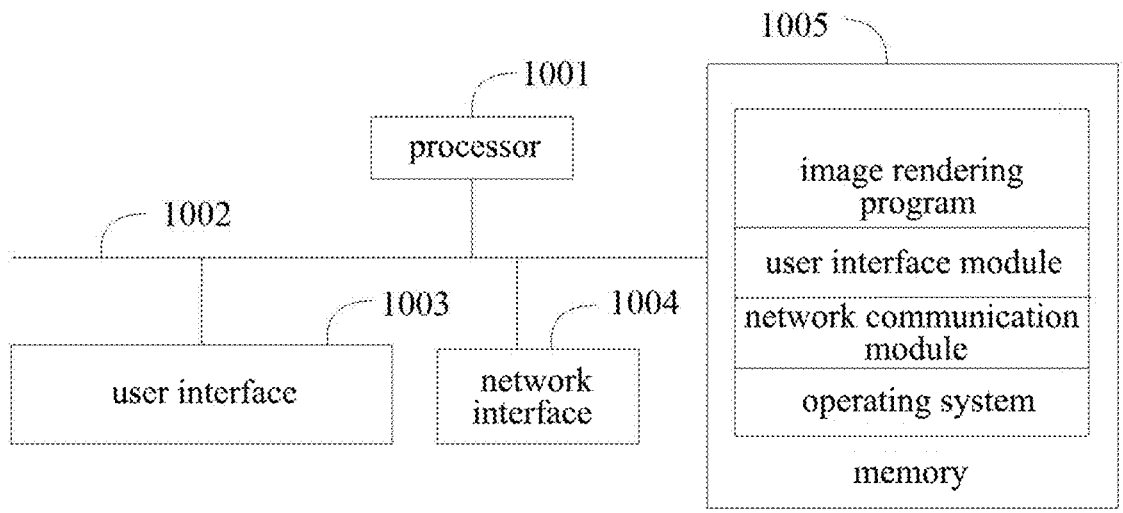
FIG. 1 is a schematic diagram of the structure of the hardware operation environment involved in the embodiments of the present disclosure.

FIG. 1 is a schematic diagram of the equipment structure of the hardware operation environment involved in the embodiments of the present disclosure.

It should be noted that the image rendering equipment of the embodiments of the present disclosure may be a smart phone, a personal computer, a server and other devices, which is not particularly limited herein.

As shown in FIG. 1, the image rendering equipment may comprise: a processor 1001, such as CPU, a network interface 1004, a user interface 1003, a memory 1005, and a communication bus 1002. The communication bus 1002 is used to realize the connection and communication between these components. The user interface 1003 may comprise a display screen, an input unit such as a keyboard. Optionally, the user interface 1003 may also comprise a standard wired interface or wireless interface. Optionally, the network interface 1004 may comprise a standard wired interface or wireless interface (such as WI-FI interface). The memory 1005 may be a high-speed RAM memory or a non-volatile memory, such as a disk memory. Optionally, the memory 1005 may also be a storage device independent of the processor 1001 described above.

Those skilled in the art can understand that the equipment structure shown in FIG. 1 does not constitute a limitation on the image rendering equipment, and it may comprise more or fewer components than those shown in the FIG. 1, or combine some components, or have different component arrangements.

As shown in FIG. 1, the memory 1005, as a computer storage medium, may comprise an operating system, a network communication module, a user interface module, and an image rendering program. The operating system is a program that manages and controls the hardware and software resources of the equipment, and supports the operation of the image rendering programs and other software or programs. In the equipment shown in FIG. 1, the user interface 1003 is mainly used for data communication with the client. The network interface 1004 is mainly used to establish communication connection with the server. The processor 1001 can be used to call the image rendering program stored in the memory 1005 and perform the following operations:

after receiving a synchronization signal transmitted according to a preset time period T1, acquiring a current first data to be rendered of a first viewpoint and starting rendering;

if the rendering of the first data to be rendered has not been completed at a T2 moment after receiving the synchronization signal, stopping rendering the first data to be rendered, and acquiring a current second data to be rendered of a second viewpoint and starting rendering, wherein 0<T2<T1;

if the rendering of the first data to be rendered has been completed before the T2 moment after receiving the synchronization signal, acquiring the second data to be rendered and starting rendering after the rendering of the first data to be rendered has been completed; and at the T2 moment after receiving the synchronization signal, performing asynchronous time warping on a frame image of the first viewpoint obtained from the last time of rendering and then storing it in a display buffer, and at a moment of receiving the synchronous signal, performing asynchronous time warping on a frame image of the second viewpoint obtained from the last time of rendering and then storing it in the display buffer.

Further, the operation of, after receiving a synchronization signal transmitted according to a preset time period T1, acquiring a current first data to be rendered of a first viewpoint and starting rendering comprises:

when receiving the synchronization signal transmitted according to the preset time period T1, detecting whether there is a third data to be rendered that is being rendered at the second viewpoint;

if yes, stopping rendering the third data to be rendered, and acquiring the current first data to be rendered of the first viewpoint and starting rendering;

if no, acquiring the first data to be rendered and starting rendering.

Further, the processor 1001 can be also used to call the image rendering program stored in the memory 1005 and perform the following operations:

at the moment of receiving the synchronization signal, acquiring a first viewpoint frame image of the first viewpoint currently buffered in the display buffer; and using the first viewpoint frame image to refresh a frame image of the first viewpoint currently displayed in the display device.

Further, the processor 1001 can be also used to call the image rendering program stored in the memory 1005 and perform the following operations:

at the T2 moment after receiving the synchronization signal, acquiring a second viewpoint frame image of the second viewpoint currently buffered in the display buffer; and using the second viewpoint frame image to refresh a frame image of the second viewpoint currently displayed in the display device.

Further, the processor 1001 can be also used to call the image rendering program stored in the memory 1005 and perform the following operations:

if the rendering of the first data to be rendered has not been completed at the T2 moment after receiving the synchronization signal, increasing a number of times of frame dropping of the first viewpoint by one; and when it is detected that the number of times of frame dropping of the first viewpoint reaches a preset number, increasing T2, wherein the T2 after increased is less than T1.

Further, the processor 1001 can be also used to call the image rendering program stored in the memory 1005 and perform the following operations:

if the rendering of the first data to be rendered has not been completed at the T2 moment after receiving the synchronization signal, increasing a number of times of frame dropping of the first viewpoint by one;

if there is data to be rendered that is being rendered at the second viewpoint at the moment of receiving the synchronization signal, increasing a number of times of frame dropping of the second viewpoint by one;

when it is detected that a ratio of the number of times of frame dropping of the first viewpoint to the number of times of frame dropping of the second viewpoint is greater than a preset ratio, increasing T2, wherein the T2 after increased is less than T1; and When it is detected that a ratio of the number of times of frame dropping of the second viewpoint to the number of times of frame dropping of the first viewpoint is greater than the preset ratio, decreasing T2, wherein the T2 after decreased is greater than 0.

Further, the processor 1001 can be also used to call the image rendering program stored in the memory 1005 and perform the following operations:

when the synchronization signal is received for the first time, setting one of the first viewpoint and the second viewpoint as a left eye viewpoint and the other as a right eye viewpoint; and exchanging the settings of the first viewpoint and the second viewpoint about the left and right eye viewpoints every preset time period T3 since the synchronization signal is received for the first time.

Based on the above structure, various embodiments of the image rendering method are proposed.

Figure 2:
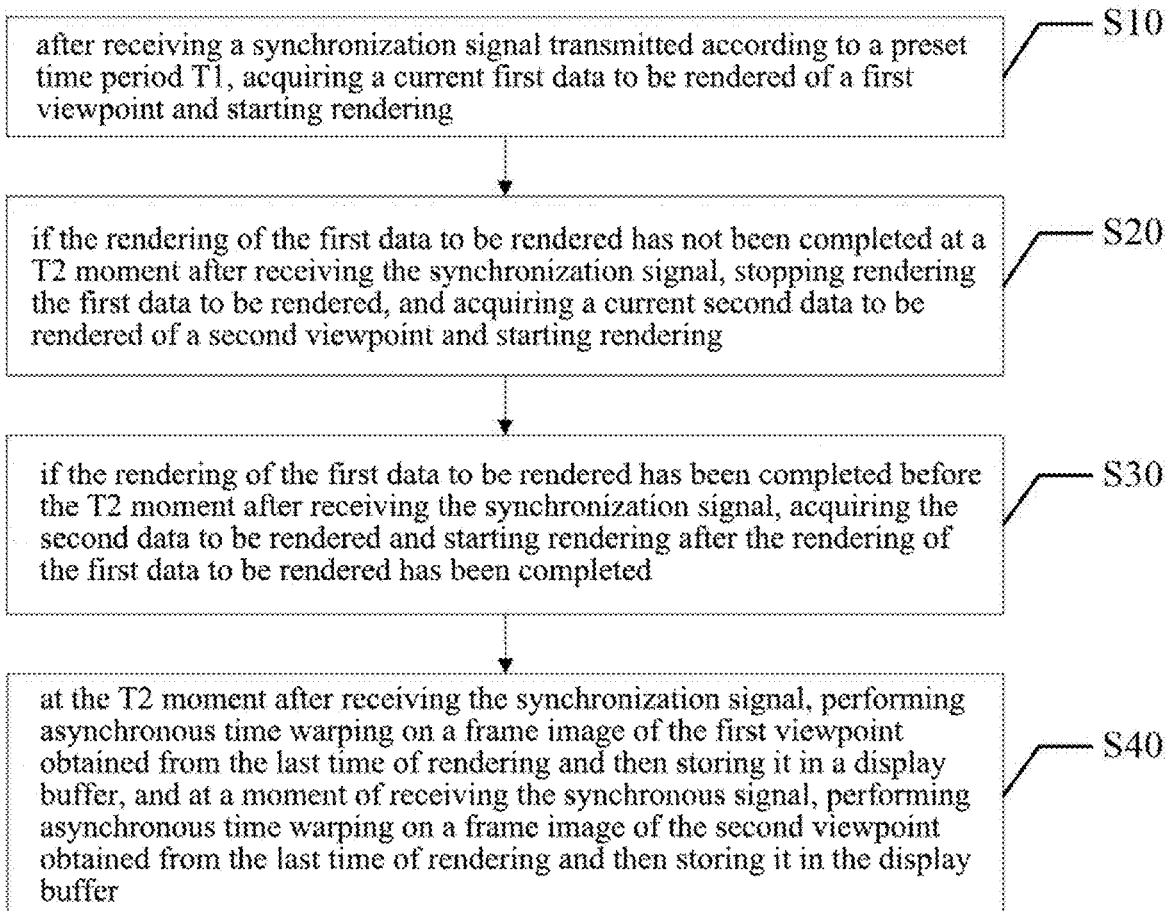
FIG. 2 is a schematic flowchart of a first embodiment of an image rendering method of the present disclosure.

FIG. 2 is a schematic flowchart of a first embodiment of an image rendering method of the present disclosure.

The present disclosure provides embodiments of image rendering methods. It should be noted that, although the logical order is shown in the flowchart, in some cases, the steps shown or described may be executed in a different order from the order shown herein. The image rendering method of the present disclosure is applied to the device or processor that can perform image rendering, for example, it can be applied to the image processor GPU. The embodiments will be illustrated below by taking the GPU as an example.

In this embodiment, the image rendering method comprises:

Step S10: after receiving a synchronization signal transmitted according to a preset time period T1, acquiring a current first data to be rendered of a first viewpoint and starting rendering;

The synchronization signal is a signal that controls the refresh rate of the display device. In this embodiment, the synchronization signal may be a vertical synchronization (vsync) signal or other signals that can control the refresh rate of the display device. Generally, the graphics card DAC (digital to analog converter) generates a vsync after each frame scanning, indicating the end of a frame and the beginning of a new frame. In this embodiment, the time period of transmitting a synchronization signal is called T1, Namely, one synchronization signal is transmitted every T1. Every time the GPU receives a synchronization signal, it will execute the same rendering process, but the data being processed will change every time. The following is a specific description by taking a synchronization signal as an example.

When the GPU receives a synchronization signal, it acquires the current data to be rendered of the first viewpoint (hereinafter referred to as the first data to be rendered for differentiation), and starts rendering the first data to be rendered. In the VR (Virtual Reality)/AR (Augmented Reality) scenarios, different images are rendered for the left and right eyes to produce a 3D visual effect. In this embodiment, the first viewpoint can be one of the left eye and the right eye. If the first viewpoint is the left eye, the second viewpoint will be the right eye; if the first viewpoint is the right eye, the second viewpoint will be the left eye. The data to be rendered refers to the data to be rendered by the GPU, such as vertex data, texture data, etc. The data to be rendered may come from the CPU, or from the output results of the previous step in the GPU data processing flow. There is no limitation on the source of the data to be rendered herein. The rendering of the data to be rendered may comprise vertex shading, texture filling and other rendering operations, which may refer to the existing GPU image rendering principles for details and will not be repeated in detail here. The data to be rendered of the same viewpoint will be updated with time, and the period of updating may or may not be synchronized with the time period of transmitting the synchronization signal, which is not limited in this embodiment. When the GPU needs to acquire the data to be rendered of the first viewpoint after receiving the synchronization signal, it acquires the data to be rendered at the current moment of the first viewpoint for rendering. It should be noted that in VR/AR scenarios, the rendering should be performed in combination with the user's head motion postures. When GPU renders the first data to be rendered of the first viewpoint, it may also acquire the posture data at the current moment, and render the data to be rendered based on the posture data.

It should be noted that when the GPU receives the synchronization signal, it may immediately acquire the current first data to be rendered of the first viewpoint and start rendering; alternatively, it may start rendering after a certain period of time, which is not limited in this embodiment. For example, if the GPU receives a synchronization signal and the work being rendered has not been completed, in an embodiment, the GPU may acquire the current first data to be rendered of the first viewpoint after the work being rendered has been completed and start rendering; in another embodiment, the GPU may also stop the work being rendered and immediately acquire the current first data to be rendered of the first viewpoint and start rendering.

Step S20, if the rendering of the first data to be rendered has not been completed at a T2 moment after receiving the synchronization signal, stopping rendering the first data to be rendered, and acquiring a current second data to be rendered of a second viewpoint and starting rendering, wherein 0<T2<T1;

After receiving the synchronization signal, the GPU may detect whether the rendering of the first data to be rendered has been completed before the T2 moment after receiving the synchronization signal. If the rendering of the first data to be rendered has not been completed at the T2 moment after receiving the synchronization signal, the GPU may stop rendering the first data to be rendered, acquire the current data to be rendered at the second viewpoint (hereinafter referred to as the second data to be rendered for differentiation), and start rendering the second data to be rendered. T2 may be a time length set in advance as required. T2 is greater than 0 and less than T1, and may be set according to the average rendering time of the data to be rendered of the first and second viewpoints. For example, if the average rendering time of the data to be rendered of the first and second viewpoints is similar, T2 may be set to a half of T1. When the rendering of the first data to be rendered has not been completed at the T2 moment after receiving the synchronization signal, it means that the rendering of the first data to be rendered takes a long time. At the T2 moment, the GPU will perform asynchronous time warping on the frame image of the first viewpoint obtained from the last time of rendering. At this point, since the rendering of the first data to be rendered has not been completed yet, the frame image on which the GPU performs asynchronous time warping is the frame image rendered from the previous data to be rendered at the first viewpoint. Therefore, continuing to render the first data to be rendered is merely useless work done by the GPU. Thus, in this embodiment, when the rendering of the first data to be rendered has not been completed at the T2 moment, the rendering of the first data to be rendered stops so as to avoid the useless rendering work done by the GPU.

Specifically, a timer may be provided in the GPU to start time counting after receiving the synchronization signal, and detect whether the rendering of the first data to be rendered has been completed before the length of time counted by the timer reaches T2.

Step S30, if the rendering of the first data to be rendered has been completed before the T2 moment after receiving the synchronization signal, acquiring the second data to be rendered and starting rendering after the rendering of the first data to be rendered has been completed;

If the rendering of the first data to be rendered has been completed before the T2 moment after the GPU receives the synchronization signal, the GPU may acquire the second data to be rendered after the rendering of the first data to be rendered has been completed and start rendering. When the rendering of the first data to be rendered has been completed before the T2 moment, it indicates that the rendering of the first data to be rendered takes a short time. If the second data to be rendered of the second viewpoint is not rendered until the T2 moment, the GPU's rendering process is paused from the time when the rendering of the first data to be rendered has been completed to the T2 moment, which obviously wastes the GPU's computing resources. Moreover, it is very likely that the second data to be rendered will take a long time so that the rendering of the second data to be rendered has not been completed at the moment of receiving the next synchronization signal, and thus the rendering of the second data to be rendered by GPU will become useless work. As a result, in this embodiment, when the rendering of the first data to be rendered has been completed before the T2 moment, the GPU may immediately acquire the second data to be rendered at the current moment of the second viewpoint for rendering, so as to avoid the wasting of GPU resources due to the waiting state of the GPU. Moreover, since the rendering of the second data to be rendered starts at an earlier moment, the rendering completion rate of the second data to be rendered is also improved, thereby further reducing the possibility of GPU doing useless work, namely, improving the utilization ratio of image rendering. Image rendering utilization ratio refers to the ratio of the number of times that the GPU rendered frame images are used to the total number of times of GPU rendering (including completed renderings and uncompleted renderings).

Step S40, at the T2 moment after receiving the synchronization signal, performing asynchronous time warping on a frame image of the first viewpoint obtained from the last time of rendering and then storing it in a display buffer, and at a moment of receiving the synchronous signal, performing asynchronous time warping on a frame image of the second viewpoint obtained from the last time of rendering and then storing it in the display buffer.

The GPU, at the T2 moment receiving the synchronous signal, performs asynchronous time warping on the frame image of the first viewpoint obtained from the last time of rendering, and stores the frame image obtained after the asynchronous time warping in the display buffer; at the moment of receiving the synchronization signal, performs asynchronous time warping on the frame image of the second viewpoint obtained from the last time of rendering, and store the frame image obtained after the asynchronous time warping into the display buffer. The asynchronous time warping refers to the time warping of the frame image performed by the GPU via another thread (hereinafter referred to as ATW thread). The ATW thread and the process of rendering the data to be rendered may run in parallel. For example, at the T2 moment, the GPU renders the second data to be rendered via the rendering thread, and at the same time, the ATW thread also starts the time warping on the frame image, and the two threads may execute in parallel. The display buffer is a buffer used to store frame images that may be displayed by the display. In other words, the frame images displayed by the display will be acquired from the display buffer. The positions where the frame images corresponding to the first viewpoint and the second viewpoint are stored in the display buffer may be set in advance. For example, the positions in the display buffer that are used to store the frame images corresponding to the first viewpoint are called the first viewpoint buffer, and the positions in the display buffer that are used to store the frame images corresponding to the second viewpoint are called the second viewpoint buffer. It should be noted that the GPU will obtain a frame image (hereinafter referred to as "frame image") after rendering the data to be rendered. The data to be rendered will update over time, and the GPU will also continuously render and obtain new frame images. When the GPU needs to acquire a frame image for asynchronous time warping, it will acquire the frame image obtained from the last time of rendering. The GPU may store the frame images in a specific storage area, for example, a buffer for storing the frame images obtained from rendering, such as a texture buffer. The ATW thread acquires the frame image obtained from the last time of rendering from this specific storage area.

It can be understood that if the rendering of the first data to be rendered has been completed before the T2 moment after receiving the synchronization signal, then when the asynchronous time warping is performed at the T2 moment, the frame image obtained from the last time of rendering of the first viewpoint is the frame image obtained from the rendering of the first data to be rendered; if the rendering of the first data to be rendered has not been completed at the T2 moment after receiving the synchronization signal, the frame image on which the asynchronous time warping is performed at the T2 moment is the frame image obtained from the previous rendering of the first viewpoint. If the rendering of the second data to be rendered has been completed before receiving the next synchronization signal, then when the asynchronous time warping is performed at the moment of receiving the next synchronization signal, the frame image obtained from the last time of rendering of the second viewpoint is the frame image obtained from the rendering of the second data to be rendered; if the rendering of the second data to be rendered has not been completed at the moment of receiving the next synchronization signal, the frame image on which the asynchronous time warping is performed at the moment of receiving the next synchronization signal is the frame image obtained from the previous rendering of the second viewpoint.

In this embodiment, after receiving the synchronization signal, the current first data to be rendered of the first viewpoint is acquired to start rendering; if the rendering of the first data to be rendered has not been completed at the T2 moment after receiving the synchronization signal, the rendering of the first data to be rendered stops, and the current second data to be rendered of the second viewpoint is acquired to start rendering; if the rendering of the first data to be rendered has been completed before the T2 moment after receiving the synchronization signal, the second data to be rendered is acquired after the rendering of the first data to be rendered has been completed to start rendering; at the T2 moment after receiving the synchronization signal, the asynchronous time warping is performed on a frame image of the first viewpoint obtained from the last time of rendering, and then the frame image obtained is stored in the display buffer, and at the T2 moment after receiving the synchronization signal, the asynchronous time warping is performed on a frame image of the second viewpoint obtained from the last time of rendering, and then the frame image obtained is stored in the display buffer.

In this embodiment, when the rendering of the first data to be rendered has not been completed at the T2 moment, the rendering of the first data to be rendered stops, thereby preventing the GPU from doing useless work and wasting GPU resources by avoiding the further rendering of the first data to be rendered. When the rendering of the first data to be rendered has been completed before the T2 moment, the GPU can immediately acquire the second data to be rendered at the current moment of the second viewpoint for rendering, thereby preventing the GPU from wasting GPU resources due to the waiting state. Moreover, since the rendering of the second data to be rendered starts at an earlier moment, the rendering completion rate of the second data to be rendered is also improved, thereby further reducing the possibility of GPU doing useless work and thus improving the utilization ratio of image rendering.

Further, in an embodiment, the step S10 comprises:

Step S101, when receiving the synchronization signal transmitted according to the preset time period T1, detecting whether there is a third data to be rendered that is being rendered at the second viewpoint;

When the GPU receives the synchronization signal, it may detect whether there is a data to be rendered that is being rendered at the second viewpoint (hereinafter referred to as the third data to be rendered for differentiation). It can be understood that the third data to be rendered is also equivalent to the second data to be rendered in the last synchronization signal stage. Namely, it is equivalent to that the GPU detects whether the rendering of the second data to be rendered has been completed before receiving the next synchronization signal.

Step S102, if yes, stopping rendering the third data to be rendered, and acquiring the current first data to be rendered of the first viewpoint and starting rendering;

Step S103, if no, acquiring the first data to be rendered and starting rendering.

If there is no third data to be rendered that is being rendered, the GPU may directly acquire the first data to be rendered and start rendering.

If there is the third data to be rendered that is being rendered, the GPU may stop rendering the third data to be rendered, and acquire the current first data to be rendered of the first viewpoint and start rendering. If when receiving the synchronization signal, the rendering of the third data to be rendered has not been completed, it indicates that the rendering of the third data to be rendered takes a long time. However, at the moment when the synchronous signal is received, the GPU will perform asynchronous time warping on the frame image of the second viewpoint obtained from the last time of rendering. At this point, since the rendering of the third data to be rendered has not been completed, the frame image on which the GPU performs asynchronous time warping is the frame image obtained from the previous rendering of the second viewpoint. Therefore, continuing to render the third data to be rendered is merely useless work done by the GPU; moreover, it also occupies the rendering time of the first data to be rendered so that the rendering of the first data to be rendered cannot be completed at the T2 moment, and thus the rendering of the first data to be rendered performed by the GPU also becomes useless. As a result, in this embodiment, when the rendering of the third data to be rendered has not been completed at the moment of receiving the synchronization signal, the rendering of the third data to be rendered stops, so as to prevent the GPU from doing useless rendering work, and also avoid the rendering of the third rendering data occupying the rendering time of the first rendering data, thereby improving the rendering completion rate of the first data to be rendered, and thus further reducing the possibility of doing useless work by the GPU (i.e., improving the utilization ratio of image rendering).

Further, based on the above first embodiment, a second embodiment of the image rendering method of the present disclosure is proposed. In this embodiment, the method further comprises:

Step S50, at the moment of receiving the synchronization signal, acquiring a first viewpoint frame image of the first viewpoint currently buffered in the display buffer;

At the moment when the GPU receives the synchronization signal, the GPU acquires the frame image of the first viewpoint currently buffered in the display buffer (hereinafter referred to as the first viewpoint frame image for differentiation). Namely, the GPU, at the T2 moment after receiving the synchronization signal, performs asynchronous time warping on the frame image of the first viewpoint obtained from the last time of rendering, and stores the frame image obtained after the asynchronous time warping in the display buffer. This frame image will be acquired as the first viewpoint frame image when the GPU receives the synchronization signal next time.

Step S60, using the first viewpoint frame image to refresh a frame image of the first viewpoint currently displayed in the display device.

After acquiring the first viewpoint frame image, the GPU uses the first viewpoint frame image to refresh the frame image of the first viewpoint currently displayed in the display device. Specifically, the GPU may send the first viewpoint frame image to the display device, and the display device uses the first viewpoint frame image to refresh the frame image of the first viewpoint currently displayed. In an embodiment, the GPU may send the first viewpoint frame image based on the MIPI (Mobile Industry Processor Interface) protocol.

Further, in an embodiment, the method also comprises:

Step S70, at the T2 moment after receiving the synchronization signal, acquiring a second viewpoint frame image of the second viewpoint currently buffered in the display buffer;

At the T2 moment after the GPU receives the synchronization signal, the GPU acquires the frame image of the second viewpoint currently buffered in the display buffer (hereinafter referred to as the second viewpoint frame image for differentiation). Namely, the GPU, at the moment of receiving the synchronization signal, performs asynchronous time warping on the frame image of the second viewpoint obtained from the last time of rendering, and stores the frame image obtained after the asynchronous time warping into the display buffer. This frame image will be acquired as the second viewpoint frame image at the T2 moment after the GPU receives the synchronization signal.

Step S80, using the second viewpoint frame image to refresh a frame image of the second viewpoint currently displayed in the display device.

After acquiring the second viewpoint frame image, the GPU uses the second viewpoint frame image to refresh the frame image of the second viewpoint currently displayed in the display device. Specifically, the GPU may send the second viewpoint frame image to the display device, and the display device uses the second viewpoint frame image to refresh the frame image of the second viewpoint currently displayed. In an embodiment, the GPU may send the second viewpoint frame image based on the MIPI protocol.

Figure 3:
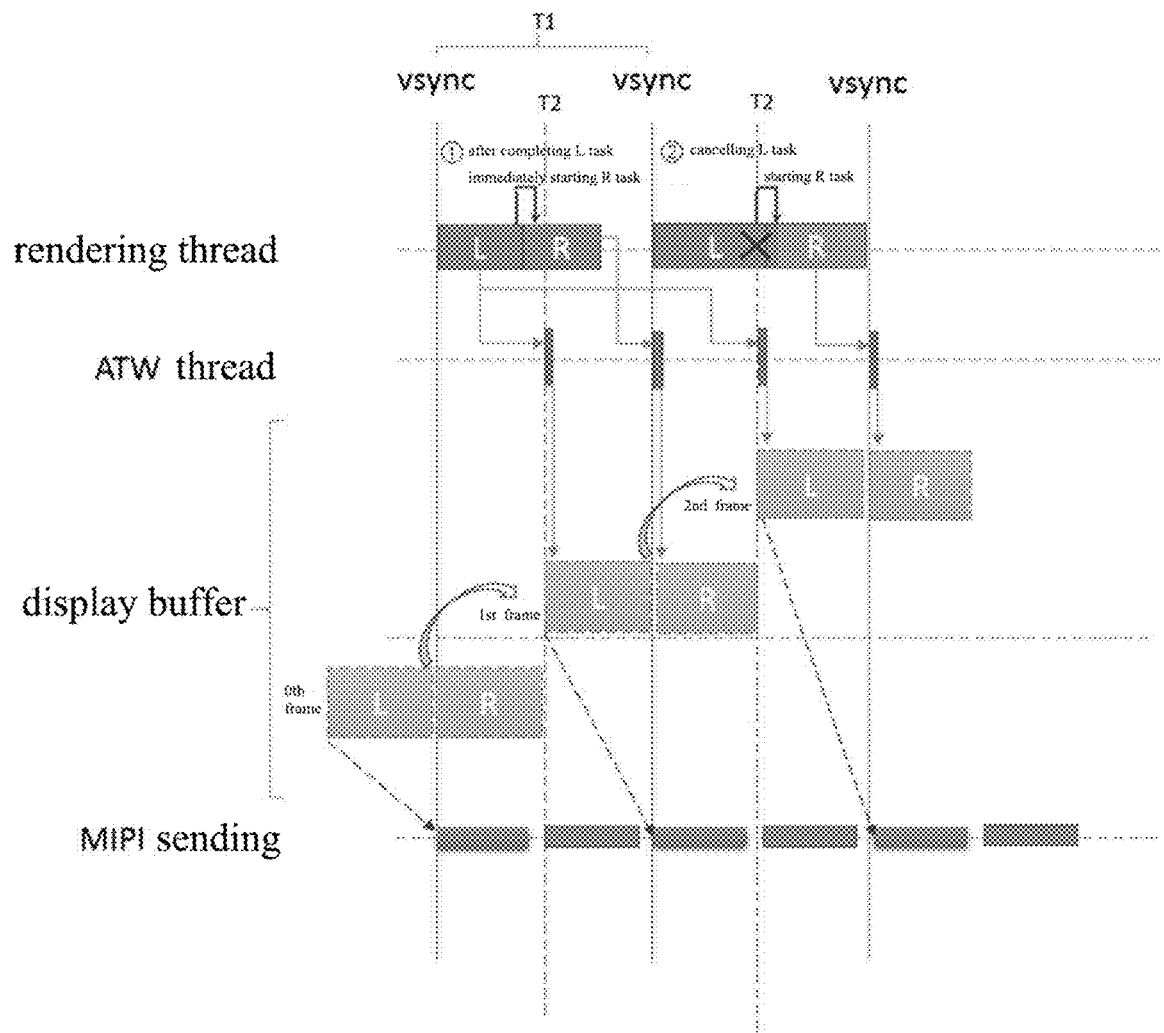
FIG. 3 is a schematic diagram of the rendering flow involved in the embodiments of the image rendering method of the present disclosure.

In an embodiment, as shown in FIG. 3, the processing flow of the rendering thread and ATW thread in two time periods T1 is shown.

Further, based on the above first and/or second embodiments, a third embodiment of the image rendering method of the present disclosure is proposed. In this embodiment, the method further comprises:

Step A10: if the rendering of the first data to be rendered has not been completed at the T2 moment after receiving the synchronization signal, increasing a number of times of frame dropping of the first viewpoint by one;

In this embodiment, the GPU may change the value of T2 to adjust the time duration that can be used to render the data to be rendered of the first and second viewpoints in one period T1.

Specifically, the GPU may count the number of times of frame dropping of the first viewpoint, and initialize the number of times of frame dropping of the first viewpoint to 0 at the beginning of the rendering process. If the rendering of the first data to be rendered has not been completed by the GPU at the T2 moment after receiving the synchronization signal, the number of times of frame dropping of the first viewpoint is increased by one, namely, the original number of times of frame dropping is increased by one. For example, if at the T2 moment after receiving the synchronization signal for the first time, the rendering of the first data to be rendered (the first data to be rendered here is with respect to the synchronization signal received for the first time) has been completed, the number of times of frame dropping of the first viewpoint is still 0; if at the T2 moment after receiving the synchronization signal for the second time, the rendering of the first data to be rendered (the first data to be rendered here is with respect to the synchronization signal received for the second time) has not been completed, the number of times of frame dropping of the first viewpoint is increased by one and becomes 1; if at the T2 moment after receiving the synchronization signal for the third time, the rendering of the first data to be rendered (the first data to be rendered here is with respect to the synchronization signal received for the third time) has been completed, the number of times of frame dropping of the first viewpoint is still 1; if at the T2 moment after receiving the synchronization signal for the fourth time, the rendering of the first data to be rendered (the first data to be rendered here is with respect to the synchronization signal received for the fourth time) has not been completed, the number of times of frame dropping of the first viewpoint is increased by one and becomes 2; and so on.

Step A20, when it is detected that the number of times of frame dropping of the first viewpoint reaches a preset number, increasing T2, wherein the T2 after increased is less than T1.

When the accumulated number of times of frame dropping of the first viewpoint reaches the preset number, the GPU may increase T2, but the T2 after increased is still less than T1. The preset number of times may be set as needed in advance, and there is no limitation herein. For example, if the preset number of times is 10, when the number of times of frame dropping of the first viewpoint is equal to 10, the GPU will increase T2. T2 may be increased by adding a preset value on the basis of T2. For example, if the original value is 10 and the preset value is 2, the T2 after increased will be 12. Alternatively, T2 may be directly set to a value larger than the original value, for example, the original value is 10, and T2 may be directly set to 12.

Further, in an embodiment, the GPU may reset the number of times of frame dropping of the first viewpoint and start the re-counting, after each increase of T2, and when the number of times of frame dropping reaches the preset number again, further increase T2. For example, when the number of times of frame dropping reaches the preset number for the first time, T2 is increased to 12, and when the number of times of frame dropping reaches the preset number for the second time, T2 is increased to 14. An upper limit may be set to ensure that the T2 after increased is less than T1.

In this embodiment, by accumulating the number of frame dropping times of the first viewpoint, when the number of frame dropping times is greater than the preset number, T2 is increased to extend the time duration that can be used to render the data to be rendered of the first viewpoint, so that the rendering success rate of the data to be rendered of the first viewpoint is improved, and thus the image rendering utilization rate of the first viewpoint is improved.

Further, based on the above first and/or second embodiments, a fourth embodiment of the image rendering method of the present disclosure is proposed. In this embodiment, the method further comprises:

Step A30, if the rendering of the first data to be rendered has not been completed at the T2 moment after receiving the synchronization signal, increasing a number of times of frame dropping of the first viewpoint by one; and Step A40, if there is data to be rendered that is being rendered at the second viewpoint at the moment of receiving the synchronization signal, increasing a number of times of frame dropping of the second viewpoint by one; and In this embodiment, the GPU may change the value of T2 to adjust the time duration that can be used to render the data to be rendered of the first and second viewpoints in one period T1.

Specifically, the GPU may count the numbers of times of frame dropping of the first viewpoint and the second viewpoint respectively, and initialize the numbers of times of frame dropping of the first viewpoint and the second viewpoint to 0 at the beginning of the rendering process. The counting method of the numbers of times of frame dropping of the first viewpoint and the second viewpoint may refer to the counting method of the number of times of frame dropping of the first viewpoint in the step A10 of the third embodiment, and will not be repeated here.

Step A50, when it is detected that a ratio of the number of times of frame dropping of the first viewpoint to the number of times of frame dropping of the second viewpoint is greater than a preset ratio, increasing T2, wherein the T2 after increased is less than T1;

When the GPU detects that the ratio of the number of times of frame dropping of the first viewpoint to the number of times of frame dropping of the second viewpoint is greater than the preset ratio, T2 may be increased, but the T2 after increased is still less than T1. The ratio of the number of times of frame dropping of the first viewpoint to the number of times of frame dropping of the second viewpoint refers to the result obtained by dividing the number of times of frame dropping of the first viewpoint by the number of times of frame dropping of the second viewpoint. The preset ratio may be set as needed in advance, and there is no limitation herein. For example, it may be set to 0.5. The method of increasing T2 may refer to the method of increasing T2 in the step A20 of the third embodiment, and will not be repeated here.

Step A60, when it is detected that a ratio of the number of times of frame dropping of the second viewpoint to the number of times of frame dropping of the first viewpoint is greater than the preset ratio, decreasing T2, wherein the T2 after decreased is greater than 0.

When the GPU detects that the ratio of the number of times of frame dropping of the second viewpoint to the number of times of frame dropping of the first viewpoint is greater than the preset ratio, T2 may be decreased, but the T2 after decreased should be greater than 0. The ratio of the number of times of frame dropping of the first viewpoint to the number of times of frame dropping of the second viewpoint refers to the result obtained by dividing the number of times of frame dropping of the first viewpoint by the number of times of frame dropping of the second viewpoint. T2 may be decreased by subtracting a preset value from T2. For example, if the original value is 10 and the preset value is 2, the T2 after decreased is 8. Alternatively, T2 may be directly set to a smaller value than the original value, for example, the original value is 10, and T2 may be directly set to 8. An upper limit may be set to ensure that the T2 after increased is less than T1, and a lower limit may be set to ensure that the T2 after decreased is greater than 0.

In an embodiment, after each increase and decrease of T2, the numbers of times of frame dropping of the first viewpoint and the second viewpoint are reset, and the re-counting starts. When the ratio is greater than the preset ratio again, T2 is further increased or decreased correspondingly.

In this embodiment, by accumulating the numbers of times of frame dropping times of the first viewpoint and the second viewpoint, when the ratio of the number of times of frame dropping times of the first viewpoint to the number of times of frame dropping times of the second viewpoint is greater than the preset threshold, T2 is increased to extend the time duration that can be used to render the data to be rendered of the first viewpoint; when the ratio of the number of times of frame dropping times of the second viewpoint to the number of times of frame dropping times of the first viewpoint is greater than the preset threshold, T2 is decreased to extend the time duration that can be used to render the data to be rendered of the second viewpoint, so that the rendering success rates of the first viewpoint and the second viewpoint are similar, thereby balancing the utilization rates of image rendering of the first viewpoint and the second viewpoint.

Further, based on the above first, second, third and/or fourth embodiments, a fifth embodiment of the image rendering method of the present disclosure is proposed. In this embodiment, the method further comprises:

Step A70, when the synchronization signal is received for the first time, setting one of the first viewpoint and the second viewpoint as a left eye viewpoint and the other as a right eye viewpoint;

When receiving the synchronization signal for the first time, the GPU may set one of the first viewpoint and the second viewpoint as the left eye viewpoint and the other as the right eye viewpoint. For example, the first viewpoint may be set as the left eye viewpoint, the second viewpoint may be set as the right eye viewpoint; alternatively, the first viewpoint may be set as the right eye viewpoint, and the second viewpoint may be set as the left eye viewpoint.

Step A80, exchanging the settings of the first viewpoint and the second viewpoint about the left and right eye viewpoints every preset time period T3 since the synchronization signal is received for the first time.

The GPU may exchange the settings of the first viewpoint and the second viewpoint about the left and right eye viewpoints every preset time period T3 since the synchronization signal is received for the first time. Namely, if the first viewpoint is a left eye viewpoint and the second viewpoint is a right eye view, then after the exchange, the first viewpoint is a right eye viewpoint and the second viewpoint is a left eye viewpoint. If the first viewpoint is a right eye viewpoint and the second viewpoint is a left eye view, then after the exchange, the first viewpoint is the left view and the second viewpoint is the right viewpoint. T3 may be set according to specific needs. In one time period T1, regarding the pictures seen by the user, the picture of one eye is refreshed first, and then the picture of the other eye is refreshed. Therefore, the exchange of the left and right eye viewpoint settings of the first viewpoint and the second viewpoint is equivalent to changing the order of refreshing pictures of the left and right eyes. To avoid the picture seen by the user getting stuck caused by frequent changes of the refresh order, T3 may be set much larger than T1. In one time period T1, the data to be rendered of the first viewpoint is rendered first, and then the data to be rendered of the second viewpoint is rendered. The rendering durations of the data to be rendered of the two viewpoints may be different, but the time durations that can be used to render the data to be rendered of the two viewpoints are relatively fixed by T2, which may lead to unbalanced rendering success rates of the two viewpoints, i.e., one has a low rendering success rate, and the other has a high rendering success rate. For users, this means that the picture of one eye is relatively smooth, but the picture of the other eye is relatively stuck. In this embodiment, in order to solve this problem, the left and right eye viewpoint settings of the first viewpoint and the second viewpoint are exchanged regularly, so that the rendering success rates of the left eye viewpoint and the right eye viewpoint is gradually balanced over time, and thus the perception of user's two eyes is more balanced and harmonious, and the user experience is improved.

Figure 4:
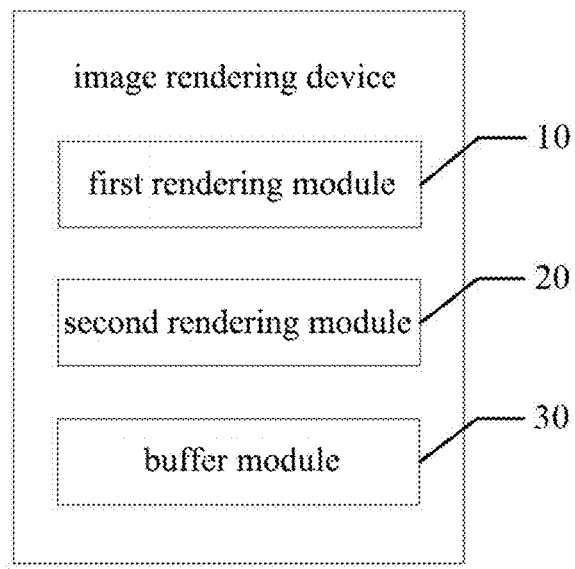
FIG. 4 is a schematic diagram of the functional modules of a preferred embodiment of the image rendering device of the present disclosure.
Figure 5:
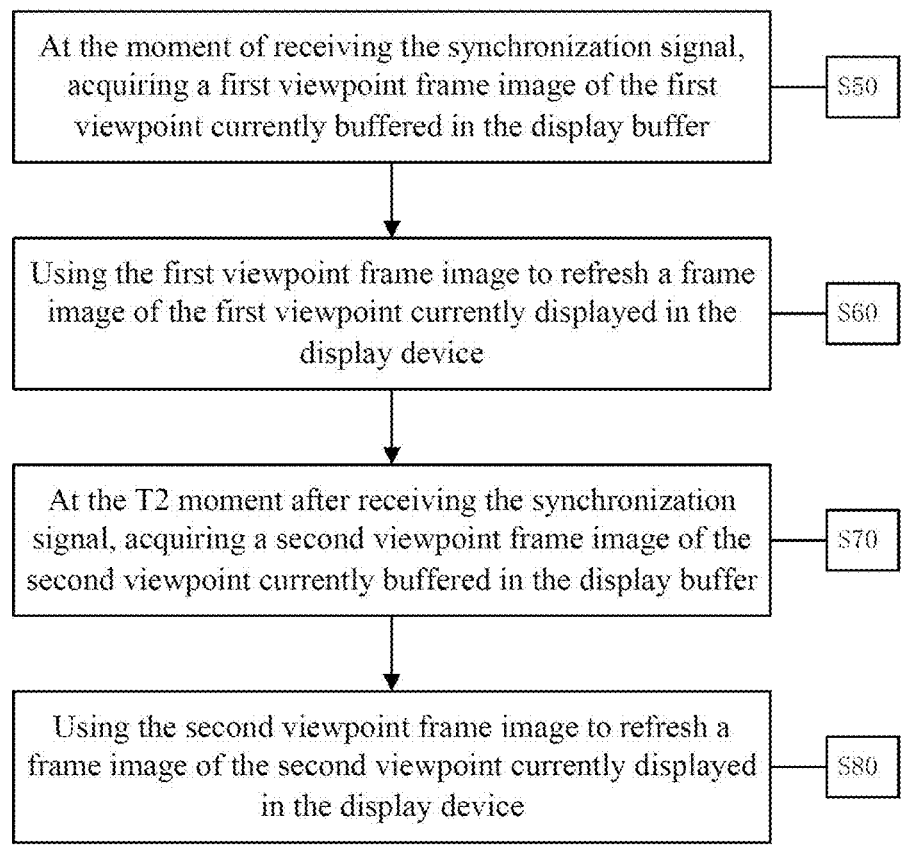
FIG. 5 is a schematic flowchart of a second embodiment of an image rendering method of the present disclosure.
Figure 6:
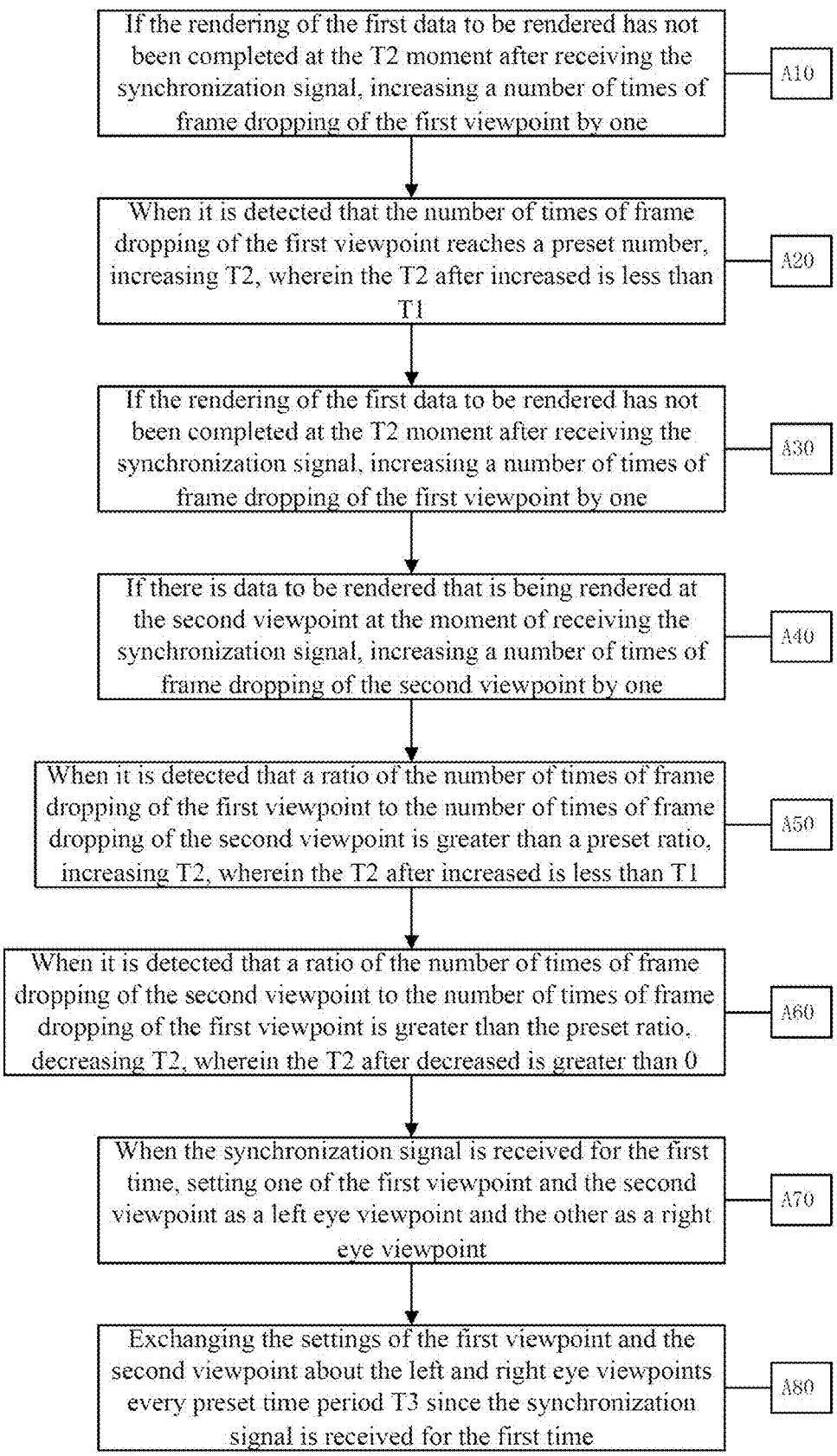
FIG. 6 is a schematic flowchart of a third embodiment of an image rendering method of the present disclosure.

In addition, an embodiment of the present disclosure also proposes an image rendering device. Referring to FIG. 4, the device comprises:

a first rendering module 10 for, after receiving a synchronization signal transmitted according to a preset time period T1, acquiring a current first data to be rendered of a first viewpoint and starting rendering;

a second rendering module 20 for, if the rendering of the first data to be rendered has not been completed at a T2 moment after receiving the synchronization signal, stopping rendering the first data to be rendered, and acquiring a current second data to be rendered of a second viewpoint and starting rendering, wherein $0<T2<T1$; and for, if the rendering of the first data to be rendered has been completed before the T2 moment after receiving the synchronization signal, acquiring the second data to be rendered and starting rendering after the rendering of the first data to be rendered has been completed; and a buffer module 30 for, at the T2 moment after receiving the synchronization signal, performing asynchronous time warping on a frame image of the first viewpoint obtained from the last time of rendering and then storing it in a display buffer, and at a moment of receiving the synchronous signal, performing asynchronous time warping on a frame image of the second viewpoint obtained from the last time of rendering and then storing it in the display buffer.

Further, the first rendering module 10 comprises:

a detection unit for when receiving the synchronization signal transmitted according to the preset time period T1, detecting whether there is a third data to be rendered that is being rendered at the second viewpoint;

the first rendering unit is for, if yes, stopping rendering the third data to be rendered, and acquiring the current first data to be rendered of the first viewpoint and starting rendering;

the second rendering unit is for, if no, acquiring the first data to be rendered and starting rendering.

Further, the device further comprises:

a first acquisition module for, at the moment of receiving the synchronization signal, acquiring a first viewpoint frame image of the first viewpoint currently buffered in the display buffer; and a first refresh module for using the first viewpoint frame image to refresh a frame image of the first viewpoint currently displayed in the display device.

Further, the device further comprises:

a second acquisition module for, at the T2 moment after receiving the synchronization signal, acquiring a second viewpoint frame image of the second viewpoint currently buffered in the display buffer; and a second refresh module for using the second viewpoint frame image to refresh a frame image of the second viewpoint currently displayed in the display device.

Further, the device further comprises:

a first accumulating module for, if the rendering of the first data to be rendered has not been completed at the T2 moment after receiving the synchronization signal, increasing a number of times of frame dropping of the first viewpoint by one; and a first adjustment module for, when it is detected that the number of times of frame dropping of the first viewpoint reaches a preset number, increasing T2, wherein the T2 after increased is less than T1.

Further, the device further comprises:

a second accumulating module for, if the rendering of the first data to be rendered has not been completed at the T2 moment after receiving the synchronization signal, increasing a number of times of frame dropping of the first viewpoint by one;

a third accumulating module for, if there is data to be rendered that is being rendered at the second viewpoint at the moment of receiving the synchronization signal, increasing a number of times of frame dropping of the second viewpoint by one;

a second adjustment module for, when it is detected that a ratio of the number of times of frame dropping of the first viewpoint to the number of times of frame dropping of the second viewpoint is greater than a preset ratio, increasing T2, wherein the T2 after increased is less than T1; and a third adjustment module for, when it is detected that a ratio of the number of times of frame dropping of the second viewpoint to the number of times of frame dropping of the first viewpoint is greater than the preset ratio, decreasing T2, wherein the T2 after decreased is greater than 0.

Further, the device further comprises:

a setting module for, when the synchronization signal is received for the first time, setting one of the first viewpoint and the second viewpoint as a left eye viewpoint and the other as a right eye viewpoint; and an exchanging module for exchanging the settings of the first viewpoint and the second viewpoint about the left and right eye viewpoints every preset time period T3 since the synchronization signal is received for the first time.

The expansion of the specific implementation of the image rendering device of the present disclosure is basically the same as that of the embodiments of the image rendering method as described above, which will not be repeated herein.

In addition, the embodiment of the present disclosure also proposes a computer-readable storage medium on which an image rendering program is stored. When the image rendering program is executed by the processor, the following steps of the image rendering method are implemented.

The embodiments of the image rendering equipment and computer-readable storage medium of the present disclosure may refer to the embodiments of the image rendering method of the present disclosure, which will not be repeated herein.

It should be noted that, the terms "comprise", "include" or any other variants used herein are intended to cover non-exclusive inclusion, so that the process, method, article or apparatus including a series of elements may not only include those elements, but may also include other elements not stated explicitly, or elements inherent to the process, method, articles or apparatus. Without more limitations, an element defined by the phrase "comprising a . . . " does not exclude the case that there are other same elements in the process, method, article or apparatus including the element.

The above serial number of the embodiments of the present disclosure is only for description and does not represent the priority order of the embodiments.

Through the above description of the embodiments, those skilled in the art can clearly understand that the above embodiment method can be implemented by means of software plus the necessary general hardware platform. Of course, it can also be implemented by hardware, but in many cases, the former is the better implementation method. Based on this understanding, the technical solution of the present disclosure, in essence or the part that contributes to the prior art, can be embodied in the form of a software product, which is stored on the above storage medium (such as ROM/RAM, magnetic disc, optical disc), and includes instructions to enable a mobile terminal (which may be a mobile phone, a computer, a server, an air conditioner, or a network device, etc.) to execute the method of each embodiment of the present disclosure.

The above only describes the preferred embodiments of the present disclosure, and does not limit the scope of the patent of the present disclosure. All equivalent substitutions of structure or process made by using the contents of the description and drawings of the present disclosure, or direct or indirect applications in other related technical fields, shall all fall within the scope of protection scope of the present disclosure.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. An image rendering method, comprising the following steps:

after receiving a synchronization signal transmitted according to a preset time period T1, acquiring a current first data to be rendered of a first viewpoint and starting rendering;

if the rendering of the first data to be rendered has not been completed at a T2 moment after receiving the synchronization signal, stopping rendering the first data to be rendered, and acquiring a current second data to be rendered of a second viewpoint and starting rendering, wherein 0<T2<T1;

if the rendering of the first data to be rendered has been completed before the T2 moment after receiving the synchronization signal, acquiring the second data to be rendered and starting rendering after the rendering of the first data to be rendered has been completed; and at the T2 moment after receiving the synchronization signal, performing asynchronous time warping on a frame image of the first viewpoint obtained from the last time of rendering and then storing it in a display buffer, and at a moment of receiving the synchronous signal, performing asynchronous time warping on a frame image of the second viewpoint obtained from the last time of rendering and then storing it in the display buffer.

2. The image rendering method according to claim 1, wherein the step of after receiving a synchronization signal transmitted according to a preset time period T1, acquiring a current first data to be rendered of a first viewpoint and starting rendering comprises:

when receiving the synchronization signal transmitted according to the preset time period T1, detecting whether there is a third data to be rendered that is being rendered at the second viewpoint;

if yes, stopping rendering the third data to be rendered, and acquiring the current first data to be rendered of the first viewpoint and starting rendering;

if no, acquiring the first data to be rendered and starting rendering.

3. The image rendering method according to claim 2, further comprising:

if the rendering of the first data to be rendered has not been completed at the T2 moment after receiving the synchronization signal, increasing a number of times of frame dropping of the first viewpoint by one; and when it is detected that the number of times of frame dropping of the first viewpoint reaches a preset number, increasing T2, wherein the T2 after increased is less than T1.

4. The image rendering method according to claim 2, further comprising:

if the rendering of the first data to be rendered has not been completed at the T2 moment after receiving the synchronization signal, increasing a number of times of frame dropping of the first viewpoint by one;

if there is data to be rendered that is being rendered at the second viewpoint at the moment of receiving the synchronization signal, increasing a number of times of frame dropping of the second viewpoint by one;

when it is detected that a ratio of the number of times of frame dropping of the first viewpoint to the number of times of frame dropping of the second viewpoint is greater than a preset ratio, increasing T2, wherein the T2 after increased is less than T1; and When it is detected that a ratio of the number of times of frame dropping of the second viewpoint to the number of times of frame dropping of the first viewpoint is greater than the preset ratio, decreasing T2, wherein the T2 after decreased is greater than 0.

5. The image rendering method according to claim 2, further comprising:

when the synchronization signal is received for the first time, setting one of the first viewpoint and the second viewpoint as a left eye viewpoint and the other as a right eye viewpoint; and exchanging settings of the first viewpoint and the second viewpoint about the left and right eye viewpoints every preset time period T3 since the synchronization signal is received for the first time.

6. The image rendering method according to claim 1, further comprising:

at the moment of receiving the synchronization signal, acquiring a first viewpoint frame image of the first viewpoint currently buffered in the display buffer; and using the first viewpoint frame image to refresh a frame image of the first viewpoint currently displayed in the display device.

7. The image rendering method according to claim 6, further comprising:

if the rendering of the first data to be rendered has not been completed at the T2 moment after receiving the synchronization signal, increasing a number of times of frame dropping of the first viewpoint by one; and when it is detected that the number of times of frame dropping of the first viewpoint reaches a preset number, increasing T2, wherein the T2 after increased is less than T1.

8. The image rendering method according to claim 6, further comprising:

if the rendering of the first data to be rendered has not been completed at the T2 moment after receiving the synchronization signal, increasing a number of times of frame dropping of the first viewpoint by one;

if there is data to be rendered that is being rendered at the second viewpoint at the moment of receiving the synchronization signal, increasing a number of times of frame dropping of the second viewpoint by one;

when it is detected that a ratio of the number of times of frame dropping of the first viewpoint to the number of times of frame dropping of the second viewpoint is greater than a preset ratio, increasing T2, wherein the T2 after increased is less than T1; and When it is detected that a ratio of the number of times of frame dropping of the second viewpoint to the number of times of frame dropping of the first viewpoint is greater than the preset ratio, decreasing T2, wherein the T2 after decreased is greater than 0.

9. The image rendering method according to claim 6, further comprising:

when the synchronization signal is received for the first time, setting one of the first viewpoint and the second viewpoint as a left eye viewpoint and the other as a right eye viewpoint; and exchanging settings of the first viewpoint and the second viewpoint about the left and right eye viewpoints every preset time period T3 since the synchronization signal is received for the first time.

10. The image rendering method according to claim 1, further comprising:
  at the T2 moment after receiving the synchronization signal, acquiring a second viewpoint frame image of the second viewpoint currently buffered in the display buffer; and
  using the second viewpoint frame image to refresh a frame image of the second viewpoint currently displayed in the display device.

11. The image rendering method according to claim 10, further comprising:
  if the rendering of the first data to be rendered has not been completed at the T2 moment after receiving the synchronization signal, increasing a number of times of frame dropping of the first viewpoint by one; and
  when it is detected that the number of times of frame dropping of the first viewpoint reaches a preset number, increasing T2, wherein the T2 after increased is less than T1.

12. The image rendering method according to claim 10, further comprising:
  if the rendering of the first data to be rendered has not been completed at the T2 moment after receiving the synchronization signal, increasing a number of times of frame dropping of the first viewpoint by one;
  if there is data to be rendered that is being rendered at the second viewpoint at the moment of receiving the synchronization signal, increasing a number of times of frame dropping of the second viewpoint by one;
  when it is detected that a ratio of the number of times of frame dropping of the first viewpoint to the number of times of frame dropping of the second viewpoint is greater than a preset ratio, increasing T2, wherein the T2 after increased is less than T1; and
  When it is detected that a ratio of the number of times of frame dropping of the second viewpoint to the number of times of frame dropping of the first viewpoint is greater than the preset ratio, decreasing T2, wherein the T2 after decreased is greater than 0.

13. The image rendering method according to claim 10, further comprising:
  when the synchronization signal is received for the first time, setting one of the first viewpoint and the second viewpoint as a left eye viewpoint and the other as a right eye viewpoint; and
  exchanging settings of the first viewpoint and the second viewpoint about the left and right eye viewpoints every preset time period T3 since the synchronization signal is received for the first time.

14. The image rendering method according to claim 1, further comprising:
  if the rendering of the first data to be rendered has not been completed at the T2 moment after receiving the synchronization signal, increasing a number of times of frame dropping of the first viewpoint by one; and
  when it is detected that the number of times of frame dropping of the first viewpoint reaches a preset number, increasing T2, wherein the T2 after increased is less than T1.

15. The image rendering method according to claim 1, further comprising:
  if the rendering of the first data to be rendered has not been completed at the T2 moment after receiving the synchronization signal, increasing a number of times of frame dropping of the first viewpoint by one;
  if there is data to be rendered that is being rendered at the second viewpoint at the moment of receiving the synchronization signal, increasing a number of times of frame dropping of the second viewpoint by one;
  when it is detected that a ratio of the number of times of frame dropping of the first viewpoint to the number of times of frame dropping of the second viewpoint is greater than a preset ratio, increasing T2, wherein the T2 after increased is less than T1; and
  When it is detected that a ratio of the number of times of frame dropping of the second viewpoint to the number of times of frame dropping of the first viewpoint is greater than the preset ratio, decreasing T2, wherein the T2 after decreased is greater than 0.

16. The image rendering method according to claim 1, further comprising:
  when the synchronization signal is received for the first time, setting one of the first viewpoint and the second viewpoint as a left eye viewpoint and the other as a right eye viewpoint; and
  exchanging settings of the first viewpoint and the second viewpoint about the left and right eye viewpoints every preset time period T3 since the synchronization signal is received for the first time.

17. Image rendering equipment, comprising a memory, a processor, and an image rendering program stored on the memory and capable of running on the processor, wherein when the image rendering program is executed by the processor, the steps of the image rendering method according to claim 1 are implemented.

18. The image rendering equipment according to claim 17, wherein the step of after receiving a synchronization signal transmitted according to a preset time period T1, acquiring a current first data to be rendered of a first viewpoint and starting rendering comprises:
  when receiving the synchronization signal transmitted according to the preset time period T1, detecting whether there is a third data to be rendered that is being rendered at the second viewpoint;
  if yes, stopping rendering the third data to be rendered, and acquiring the current first data to be rendered of the first viewpoint and starting rendering;
  if no, acquiring the first data to be rendered and starting rendering.

19. A computer-readable storage medium having an image rendering program stored thereon, wherein when the image rendering program is executed by a processor, the steps of the image rendering method according to claim 1 are implemented.

20. An image rendering device, comprising:
  a first rendering module for, after receiving a synchronization signal transmitted according to a preset time period T1, acquiring a current first data to be rendered of a first viewpoint and starting rendering;
  a second rendering module for, if the rendering of the first data to be rendered has not been completed at a T2 moment after receiving the synchronization signal, stopping rendering the first data to be rendered, and acquiring a current second data to be rendered of a second viewpoint and starting rendering, wherein 0<T2<T1; and for, if the rendering of the first data to be rendered has been completed before the T2 moment after receiving the synchronization signal, acquiring the second data to be rendered and starting rendering after the rendering of the first data to be rendered has been completed; and
  a buffer module for, at the T2 moment after receiving the synchronization signal, performing asynchronous time warping on a frame image of the first viewpoint obtained from the last time of rendering and then storing it in a display buffer, and at a moment of receiving the synchronous signal, performing asynchronous time warping on a frame image of the second viewpoint obtained from the last time of rendering and then storing it in the display buffer.

\* \* \* \* \*